United States Patent [19]

Gu

[11] Patent Number: 4,818,123

[45] Date of Patent: Apr. 4, 1989

[54] FOIL JOURNAL BEARING COOLING

[75] Inventor: Alston L. Gu, Rancho Palos Verdes, Calif.

[73] Assignee: Allied-Signal Inc., Morris Township, Morris County, N.J.

[21] Appl. No.: 84,272

[22] Filed: Aug. 10, 1987

Related U.S. Application Data

[63] Continuation-in-part of Ser. No. 889,652, Jul. 26, 1986, Pat. No. 4,701,060.

[51] Int. Cl.$^4$ .............................................. F16C 32/06
[52] U.S. Cl. ..................................... 384/106; 384/103
[58] Field of Search ............... 384/106, 120, 103, 104, 384/105

[56] References Cited

U.S. PATENT DOCUMENTS 3,602,557  8/1971  Girot ................................... 384/120
4,435,839  3/1984  Gu et al. ............................ 384/103
4,701,060 10/1987  Gu ...................................... 384/106

Primary Examiner—Lenard A. Footland
Attorney, Agent, or Firm—James W. McFarland

[57] ABSTRACT

Cooling is provided for a foil journal bearing by means of flow openings in the individual overlapping foils and/or axially extending slots formed in the high lubricity coating on the surface of the foils.

51 Claims, 5 Drawing Sheets

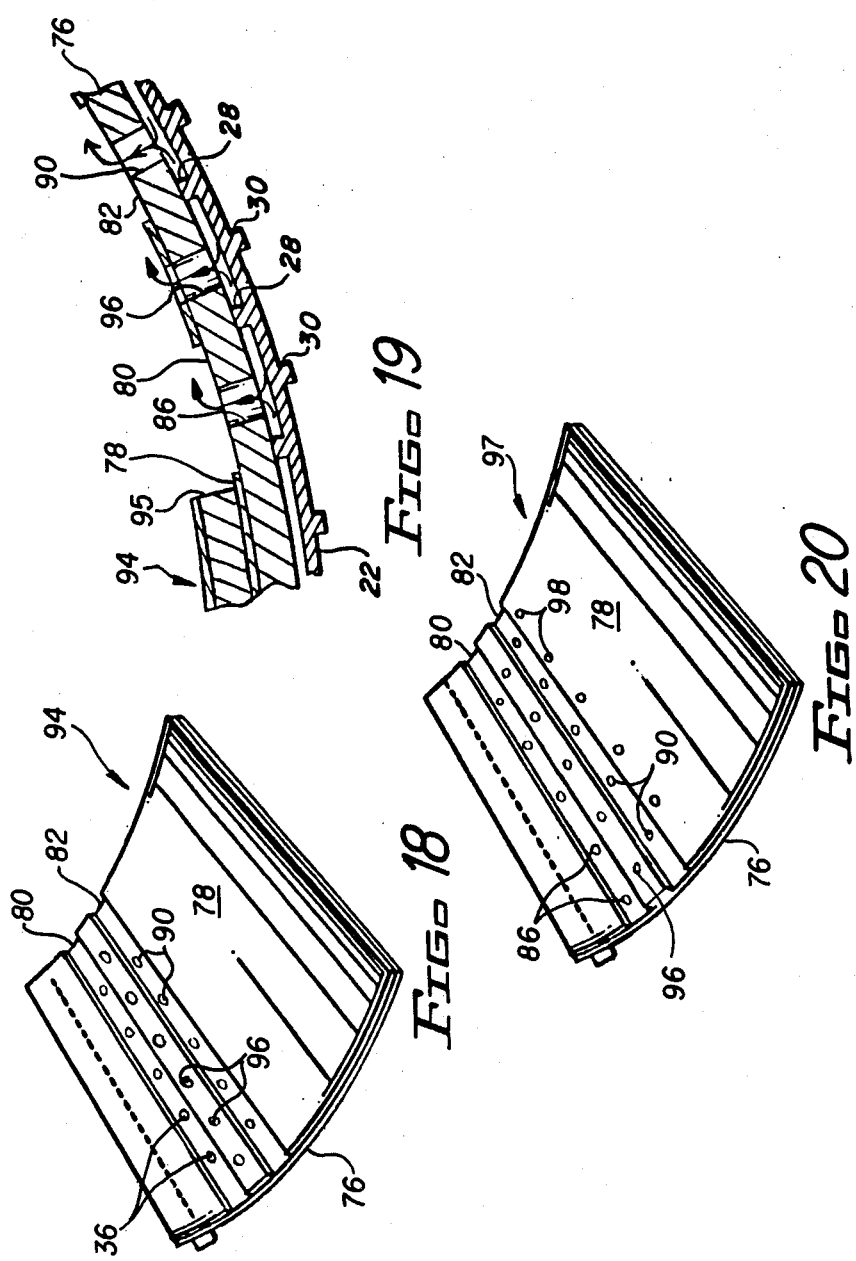

FOIL JOURNAL BEARING COOLING

REFERENCE TO RELATED APPLICATION

This application is a continuation-in-part of application Ser. No. 889,652, filed July 26, 1986 now U.S. Pat. No. 4,701,060.

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces, and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements, a number of mounting means have been devised. In journal bearings, it is conventional practice to mount the individual foils in a slot or groove in one of the bearing elements as exemplified in U.S. Pat. No. 3,615,121.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or underfoils beneath the foils to supply this required preload as exemplified in U.S. Pat. Nos. 3,893,733 and 4,153,315.

In order to facilitate start-up and to reduce bearing wear, the bearing surfaces of the individual foils may be coated with a high lubricity material such as a stratified fluorocarbon, molybdenum disulfide, graphite fluoride, or the like. The use of such coatings, while enhancing the life of the foil bearing, introduces certain operating temperature limitations thereon. As still higher temperature environments are envisioned for foil bearing operation, the temperature limitations of these coatings become critical since they cannot survive as high a temperature as the underlying generally metallic foil. Thus, higher temperature coatings must be developed or means found to limit the operating temperature at the coated foil bearing surfaces. Examples of prior cooling schemes for foil bearings can be found in U.S. Pat. Nos. 4,227,753, 4,247,155, and 4,621,930.

SUMMARY OF THE INVENTION

In the present invention, the foil journal bearing is provided with openings in the individual overlapping foils to enable the flow of cooling fluid from beneath the foils to the upper surface of the foils. The openings are located in the vicinity of the beginning of the hydrodynamic supporting wedge near the overlap from adjacent foils. Where an underspring is utilized, the openings should be over a lower ridge so as not to restrict the flow of cooling fluid from around the underspring to the cooling holes in the individual foils.

Also, when the overlapping foils are coated with a high lubricity material, the coating may be discontinued in the vicinity of the beginning of the hydrodynamic supporting wedge near the overlap from adjacent foils to form an axially extending slot or slots to promote the axial flow of cooling fluid. The foils may include openings therein in association with and in proximity to the axially extending slot or slots.

Since viscous shearing of the fluid film between the bearing foils and the rotatable element is a significant source of heating of the coated foil surfaces, the supply of cooling flow from underneath the foils and axially across the foils at the beginning of the hydrodynamic supporting wedge will reduce the operating temperature of the foil journal bearing.

BRIEF DESCRIPTION OF THE DRAWINGS

FIG. 18 is a perspective view of the individual foil of FIG. 14 having a row of openings in the foil in both the upstream slot, the downstream slot, and between the upstream and downstream slots;

FIG. 19 is an enlarged fragmentary sectional view illustrating the slots and openings in the foil for the foil of FIG. 18; and FIG. 20 is a perspective view of the individual foil of FIG. 14 having a row of openings in the foil in the upstream slot, the downstream slot, between the upstream and downstream slots, and downstream of the downstream slot.

DESCRIPTION OF THE PREFERRED EMBODIMENTS

Figure 1:
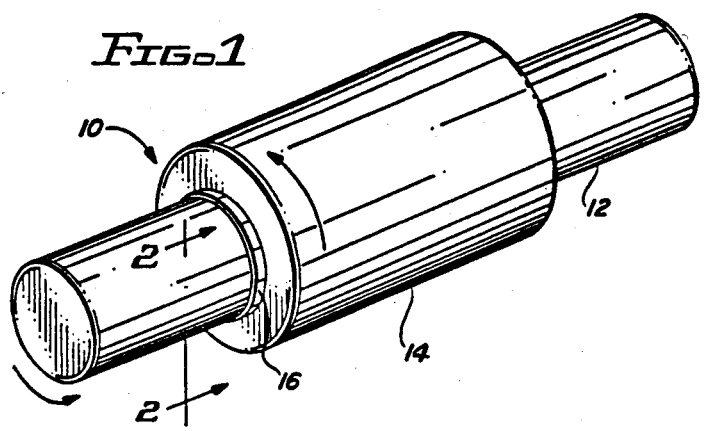
FIG. 1 is a perspective view of a foil journal bearing of the present invention.

As generally illustrated in FIG. 1, the journal bearing 10 includes a shaft 12 rotatably supported within a bushing 14 by means of a foil bearing 16. The foil bearing 16, shown in FIG. 2, generally comprises a plurality of individual, overlapping compliant foils 20 and a like number of individual foil stiffener elements or undersprings 22. Both the foils 20 and undersprings 22 are mounted in axial slots 24 in the bushing 14 in a conventional manner. While the individual curved foils 20, normally of a thin compliant metallic material are illustrated as having a separate mounting bar 26 at the leading edge thereof, the mounting means may be formed integral with the individual foils or with the foils 20 having mounting means intermediate the ends thereof as shown in U.S. Pat. No. 4,178,046.

The underspring 22, also normally of a thin compliant metallic material, generally has a predetermined curvature greater than the curvature of the individual foils 20 and includes a plurality of axially extending upper ridges 28 alternately disposed with a plurality of axially extending lower ridges 30. The function of the undersprings 22 is described in detail in U.S. Pat. Nos. 4,153,315 and 4,195,395.

Figure 2:
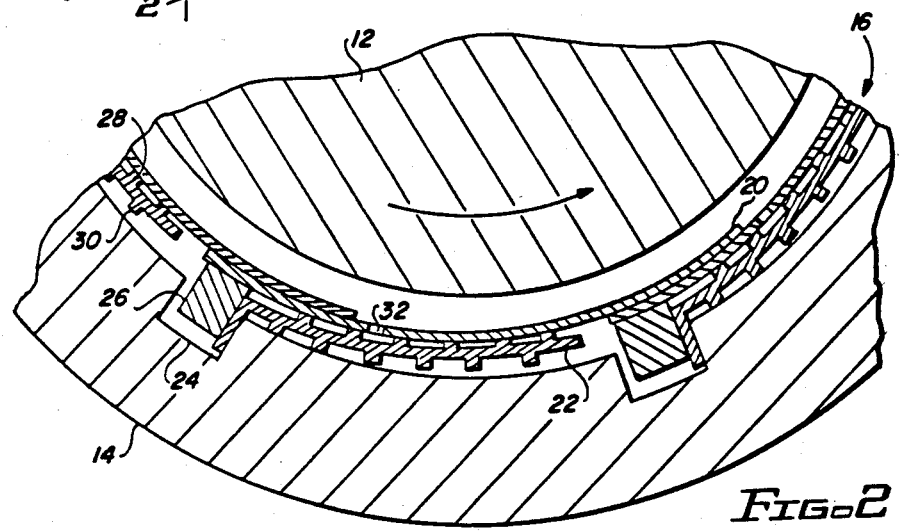
FIG. 2 is a sectional view of the foil journal bearing taken along line 2—2 of FIG. 1.
Figure 3:
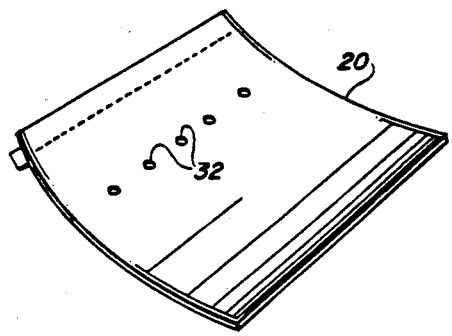
FIG. 3 is a perspective view of a individual foil of the foil journal bearing of FIG. 1 having a single row of openings.
Figure 5:
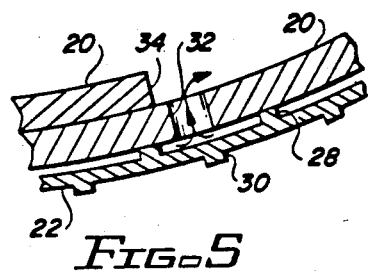
FIG. 5 is an enlarged fragmentary sectional view illustrating an individual foil opening in the vicinity of the foil overlap.

As best illustrated in FIG. 3, each individual foil 20 includes a plurality of cooling holes 32. The holes 32 are generally aligned in an axial row in the vicinity of the beginning of the hydrodynamic supporting wedge just past the trailing edge 34 of the adjacent overlapping foil as shown in FIGS. 2 and 5. In this position, the cooling flow can mix with the bearing film flow without adversely affecting the hydrodynamic pressure buildup from the relative rotation of the shaft 12 and bushing 14. The diameter of the cooling holes 32 may be on the order of 0.1 inches in diameter but may range from 0.01 to 0.50 inches. The holes would generally be sized to provide sufficient cooling flow to materially reduce the temperature of the foil bearing surface without adversely affecting the hydrodynamic wedge or the compliance of the individual foils.

In order to prevent an upper ridge 28 of the underspring 22 from restricting the flow of cooling flow through the cooling holes 32, the axial row of holes 32 would be positioned, during the operating configuration of the foil bearing 16, to be between adjacent upper ridges 28 as illustrated in FIG. 5.

Figure 4:
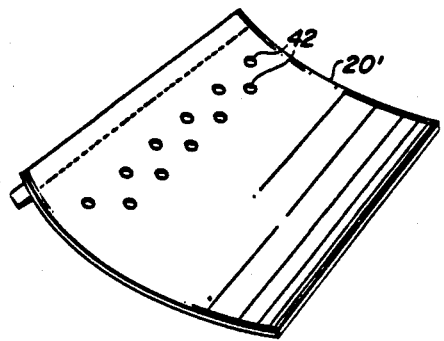
FIG. 4 is a perspective view of an alternate individual foil of the journal bearing of FIG. 1 having two rows of openings.
Figure 6:
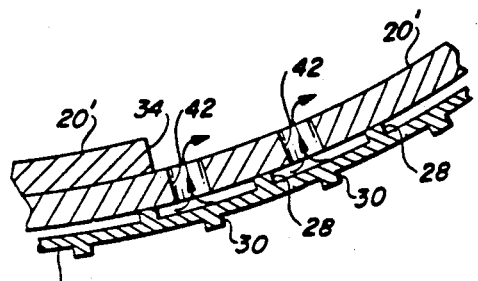
FIG. 6 is an enlarged fragmentary sectional view illustrating the foil openings of the alternate individual foil of FIG. 4 in relation to the upper ridges of the undersprings.

The alternate individual foil 20' of FIG. 4, includes two axial rows of cooling holes 42, with the cooling holes in the axial row closest to the trailing edge of foil 20' generally between the cooling holes in the axial row farthest from the trailing edge. Each of the axial rows of cooling holes 42 would be disposed over an opening between two upper ridges of the underfoil beneath the foil 20' with an upper ridge between the axial rows as shown in FIG. 6.

FIGS. 7 through 13 illustrate an alternate cooling arrangement in which the high lubricity material coating on the foils is discontinued in the vicinity of the overlap from an adjacent foil to form an axially extending slot on the foil. This coating, such as a stratified fluorocarbon, polyamide bonded graphite fluoride, or molybdenum disulfide, is provided on the foil surface exposed toward the rotating member in order to provide a high lubricity surface thereon.

Figure 7:
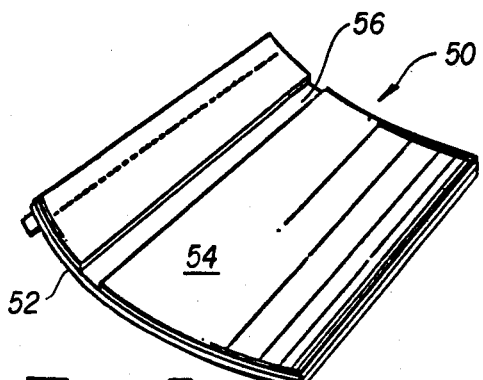
FIG. 7 is a perspective view of an alternate individual foil of the journal bearing of FIG. 1 having a single axially extending slot in the foil coating.

As illustrated in FIG. 7, the individual foils 50 include suitable mounting means such as the mounting bar 58 at one end thereof. The thin compliant metallic foil element 52 includes a high lubricity coating 54 thereon. A slot 56 is formed on the surface of the foil 50 by removing a portion of the coating 54 on the metallic foil element 52. Alternately, the coating 54 may be formed with the discontinuity or slot 56 thereon when it is applied to the metallic foil element 52.

Figure 8:
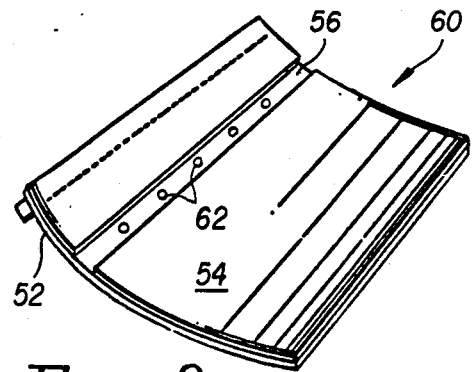
FIG. 8 is a perspective view of the individual foil of FIG. 7 having a row of openings in the foil in the slot in the foil coating.
Figure 9:
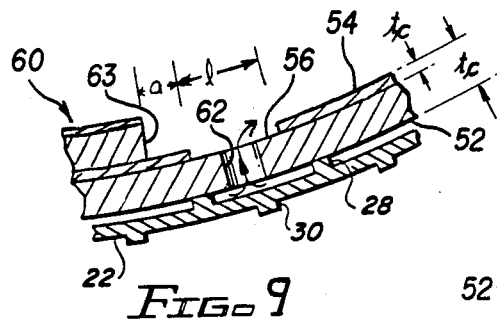
FIG. 9 is an enlarged fragmentary sectional view illustrating the slot in the coating and the openings in the foil for the foil of FIG. 8.

The individual foil 60 illustrated in FIG. 8 includes a plurality of holes 62 extending through the foil element 52 in the slot 56. These holes 62 would normally be in an axial row. As best illustrated in FIG. 9, the holes 62 in slot 56 are required to be positioned between adjacent upper ridges 28 in the foil stiffener element or underspring 22 beneath the individual foils 60. In FIG. 9, the thickness of the coating 54 is designated as $t_c$ while the thickness of the overall foil 60 is designated as $t_f$. In order for the cooling flow to be effective in the slot 56 it is necessary that the ratio between the coating thickness $t_c$ and the foil thickness $t_f$ be at least 1/50 as a minimum. The maximum ratio of $t_c$ over $t_f$ can be as high as unity. The slot 56 is illustrated as being a dimension "a" from the trailing edge 63 of the adjacent foil 60 and also as having an arcuate dimension or width of "1".

Figure 10:
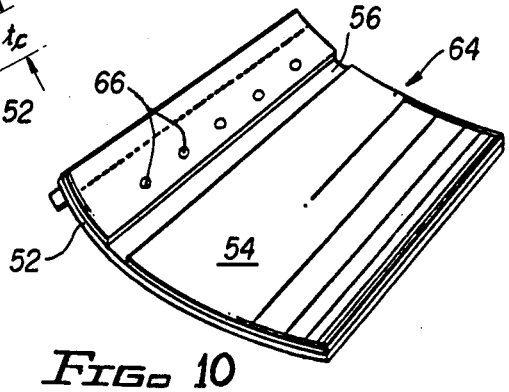
FIG. 10 is a perspective view of the individual foil of FIG. 7 having a row of openings in the foil upstream of the slot in the coating.
Figure 12:
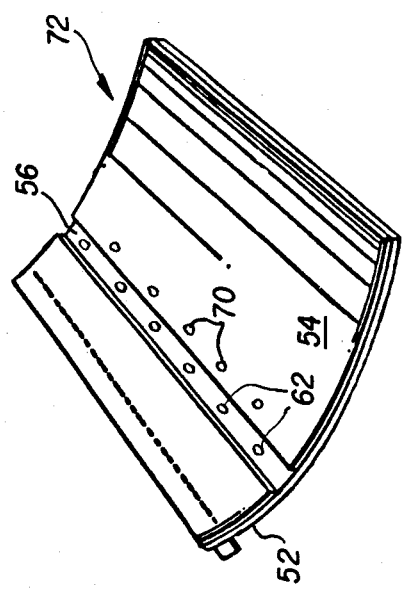
FIG. 12 is a perspective view of the individual foil of FIG. 7 having a row of openings in the foil in the slot of the foil coating and a row of openings in the foil downstream of the slot in the coating.
Figure 11:
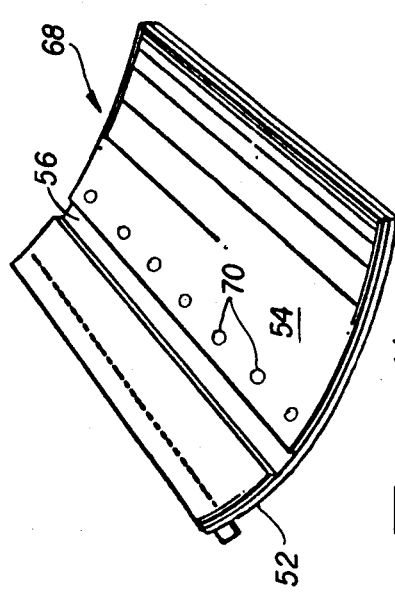
FIG. 11 is a perspective view of the individual foil of FIG. 7 having a row of openings in the foil downstream of the slot in the coating.

In the embodiment illustrated in FIG. 10, the individual foil 64 includes an axially extending row of cooling holes 66 upstream of the slot 56. These cooling holes 66 extend through both the foil coating 54 and foil element 52. The individual foil 68 of FIG. 11 includes an axially extending row of cooling holes 70 downstream of the slot 56. These holes 70 likewise extend through both the coating 54 and foil element 52. FIGS. 12 illustrates an individual foil 72 having both an axial row of cooling holes 62 in the slot 56 and an axially extending row of cooling holes 70 downstream of the slot 56. The cooling holes 62 in slot 56 would normally be axially displaced from the cooling holes 70 downstream of slot 56.

Figure 13:
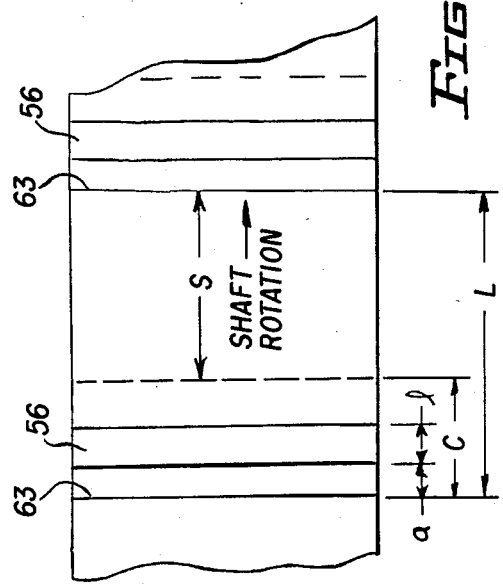
FIG. 13 is a plan view of a plurality of overlapping foils of FIG. 7.

The plan view of a plurality of overlapping foils illustrated in FIG. 13 designates the distance between the trailing edges 63 of adjacent foils as length "L". The length of the hydrodynamic bearing action zone, which provides the hydrodynamic supporting wedge, is designated as "S", while the length of the bearing cooling area is designated as "C", (L=S +C). So as not to interfere with the hydrodynamic film or supporting wedge, the slot 56 and any cooling holes either in the slot 56 or upstream or downstream thereof must be disposed in the area before the hydrodynamic wedge, namely the bearing cooling area "C". The arcuate width of the slot 56, "1" and the distance between the trailing edge 63 of the foil 60 and the beginning of the slot 56 "a" must be less than "C". To be effective, the width of the slot "1" should generally be between 1% to 30% of the distance between the trailing edges 63 of adjacent overlapping foils "L". Likewise, the distance between the trailing edge 63 of the foil 60 and the beginning of the slot 56 should be between zero and 100 times the thickness of the foil $t_f$.

Figure 14:
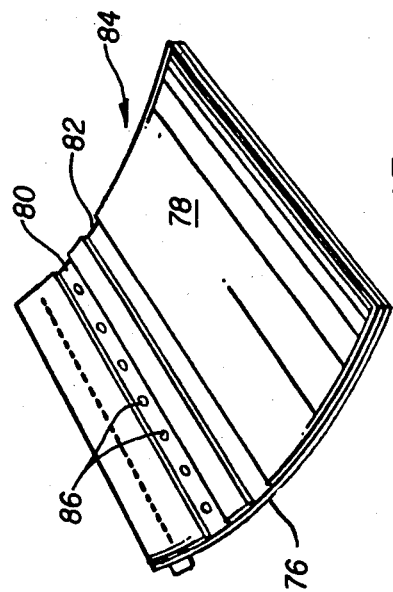
FIG. 14 is a perspective view of another alternate individual foil of the journal bearing of FIG. 1 having two axially extending slots in the foil coating.

FIGS. 14-20 illustrate individual foils having two slots in the coating on the foils. As shown in FIG. 14, the individual foil 74, having mounting means 58, comprises the foil element 76 with a high lubricity coating 78 thereon. An upstream slot 80 and downstream slot 82 are provided in the foil coating 78.

Figure 15:
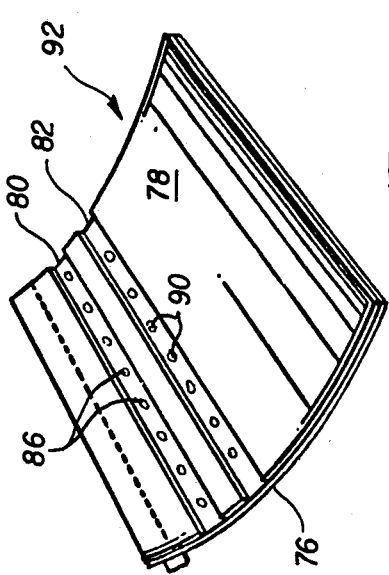
FIG. 15 is a perspective view of the individual foil of FIG. 14 having a row of openings in the foil in the upstream slot in the foil coating.
Figure 16:
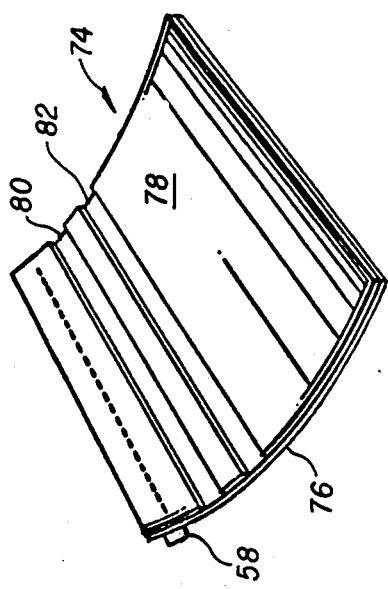
FIG. 16 is a perspective view of the individual foil of FIG. 14 having a row of openings in the foil in downstream slot in the foil coating.
Figure 17:
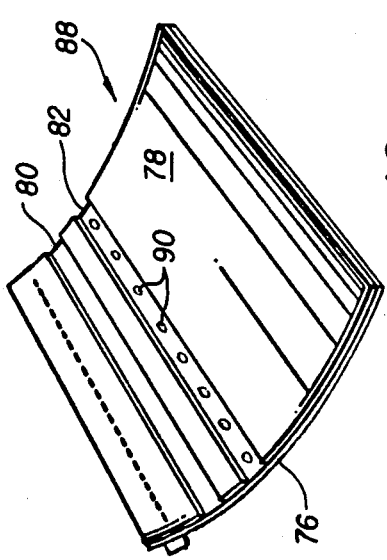
FIG. 17 is a perspective view of the individual foil of FIG. 14 having a row of openings in the foil in both the upstream slot and the downstream slot in the foil coating.

The individual foil 84 illustrated in FIG. 15 includes a plurality of axially extending holes 86 in the upstream slot 80. These holes extend through the metallic foil element 76. Likewise, the downstream slot 82 may include a plurality of holes 90 as illustrated in FIG. 16. FIG. 17 illustrates an individual foil 92 having holes 86 in upstream slot 80 and holes 90 in downstream slot 82. Holes 86 and 90 would be normally axially displaced from the other.

In addition to holes 86 in upstream slot 80 and holes 90 in downstream slot 82, the individual foils 94 illustrated in FIGS. 18 and 19 include a row of holes 96 between the upstream slot 80 and downstream slot 82. The holes 96 between the slots 80 and 82 extend through the coating 78 and metallic foil element 76. As best illustrated in FIG. 19, the holes 86, 90 and 96 must each be disposed between adjacent upper ridges 28 of the underspring 22 so that the upper ridges 28 will not interfere with the flow of cooling fluid through these holes.

FIG. 20 illustrates an individual foil 97 which includes an axial row of holes 86 in upstream slot 80, an axial row of holes 90 in downstream slot 82, an axial row of holes 96 between the upstream slot 80 and downstream slot 82, and an axial row of holes 98 downstream of the downstream slot 82. As was the case with respect to the individual foils having a single slot as illustrated in FIGS. 7-13, the plurality of slots 80 and 82 and the axially extending rows of holes 86, 96, 90 and 98 must all be in the bearing cooling area "C" and thus outside of the area of the supporting hydrodynamic wedge "S". The holes should also be axially displaced.

By providing the axial extending slot(s) in the foil coating, as axial cooling flow is established before the hydrodynamic action zone and thus is very effective in removing the heat generated in the action zone. In combination with cooling holes through the bearing foil, additional cooling flow from beneath the foils is also provided. So long as the extent and number of slots and holes is limited and only provided in the cooling area, all of this can be accomplished without detrimentally affecting the hydrodynamic film generation and/or bearing load capacity.

While specific embodiments of the invention have been illustrated and described, it is to be understood that these have been provided by way of example only and that the invention is not to be construed as being limited thereto but only by the proper scope of the following claims.

I claim:

1. A fluid film journal bearing comprising:
    a pair of members arranged for relative rotation with respect to one another; and
    a compliant foil bearing operably disposed between said pair of relatively rotatable members, said compliant foiled bearing including a plurality of overlapping individual foils mounted on one of said pair of members and having a coating of high lubricity material disposed toward the other of said pair of members, said coating having at least one axially extending slot, the coating thickness being at least one fiftieth of the foil thickness.

2. The fluid film journal bearing of claim 1 wherein said coating has two spaced axially extending slots.

3. The fluid film journal bearing of claim 1 wherein the arcuate width of the axially extending coating slot is between 0.050 and 0.5 inches.

4. The fluid film journal bearing of claim 3 wherein the arcuate width of the axially extending coating slot is approximately 0.25 inches.

5. The fluid film journal bearing of claim 1 wherein the coating is selected from a stratified fluorocarbon, polyamide bonded graphite fluoride and molydenum disulfide.

6. The fluid film journal bearing of claim 1 and in addition a plurality of cooling holes through said foils downstream of said axially extending slot.

7. The fluid film journal bearing of claim 1 wherein the arcuate width of the coating slot is between 1% to 30% of the distance between adjacent overlapping foils.

8. The fluid film journal bearing of claim 1 wherein the distance from an adjacent overlapping foil to the coating slot is up to 100 times the foil thickness.

9. The fluid film journal bearing of claim 1 and in addition a plurality of cooling holes through said foils in said axially extending slot.

10. The fluid film journal bearing of claim 9 wherein said cooling holes are between 0.01 inches and 0.50 inches in diameter.

11. The fluid film journal bearing of claim 10 wherein said cooling holes are generally 0.10 inches in diameter.

12. The fluid film journal bearing of claim 1 and in addition a plurality of cooling holes through said foils upstream of said axially extending slot.

13. A fluid film journal bearing comprising:
    a bushing;
    a shaft rotatably supported within said bushing; and
    a compliant foil bearing operably disposed within said bushing, said compliant foil bearing including a plurality of individual foils mounted within said bushing and having the trailing edge thereof overlapping the leading edge of the adjacent foil and a plurality of individual foil undersprings with individual foil undersprings mounted within said bushing underneath individual foils, said individual foils having a coating of high lubricity material disposed toward said shaft rotatably supported within said bushing and said individual foils including at least one slot in the high lubricity material coating thereon just beyond where the trailing edge of the adjacent foil overlaps to provide an axial flow of fluid across said foil.

14. The fluid film journal bearing of claim 13 wherein said individual foil undersprings include alternating upper ridges and lower ridges extending generally radially therefrom, said axially extending slot includes a first axially extending row of cooling holes through said foils, said individual foils include a second axially extending row of cooling holes therein between the trailing edge of the adjacent foil and said slot and a third axially extending row of cooling holes therein downstream of said slot, the cooling holes in said first, second, and third rows axially displaced from the cooling holes in the other of said rows and each of said first, second, and third rows generally disposed between adjacent upper ridges of said individual foil undersprings.

15. The fluid film journal bearing of claim 13 wherein said individual foils have two axially extending slots.

16. The fluid film journal bearing of claim 13 wherein the arcuate width of the axially extending slot is approximately 0.25 inches.

17. The fluid film journal bearing of claim 13 wherein the coating is selected from a stratified fluorocarbon, polyamide bonded graphite fluoride and molybdenum disulfide.

18. The fluid film journal bearing of claim 13 wherein the coating thickness is at least one fiftieth of the foil thickness.

19. The fluid film journal bearing of claim 13 wherein the arcuate width of the slot is between 1% to 30% of the distance between adjacent overlapping foils.

20. The fluid film journal bearing of claim 13 wherein the distance from the adjacent overlapping foil to the slot is up to 100 times the foil thickness.

21. The fluid film journal bearing of claim 13 wherein said individual foil undersprings include alternating upper ridges and lower ridges extending generally radially therefrom and said axially extending slot includes a plurality of cooling holes through said foils generally disposed between adjacent upper ridges of said individual foil undersprings.

22. The fluid film journal bearing of claim 13 wherein said individual foil undersprings include alternating upper ridges and lower ridges extending generally radially therefrom and said individual foils include an axially extending row of cooling holes therein between the trailing edge of the adjacent foil and said slot, said axially extending row of cooling holes generally disposed between adjacent upper ridges of said individual foil undersprings.

23. The fluid film journal bearing of claim 13 wherein said individual foil undersprings include alternating upper ridges and lower ridges extending generally radially therefrom and said individual foils include an axially extending row of cooling holes therein downstream of said slot, said axially extending row of cooling holes generally disposed between adjacent upper ridges of said individual foil undersprings.

24. A fluid film journal bearing comprising:
a bushing;
a shaft rotatably supported within said bushing; and
a compliant foil bearing operably disposed within said bushing, said compliant foil bearing including a plurality of individual foils mounted within said bushing and having the trailing edge thereof overlapping the leading edge of the adjacent foil and a plurality of individual foil undersprings with individual foil undersprings mounted within said bushing underneath individual foils, said individual foils having a coating of high lubricity material disposed toward said shaft rotatably supported within said bushing and said individual foils including a first slot in the high lubricity material coating thereon just beyond where the trailing edge of the adjacent foil overlaps and a second slot in the high lubricity material coating spaced from and downstream of said first slot, said first and second slots to provide an axial flow of fluid across said foil.

25. The fluid film journal bearing of claim 24 wherein said individual foil undersprings include alternating upper ridges and lower ridges extending generally radially therefrom and wherein said first and second slots are generally disposed between adjacent upper ridges of said individual foil undersprings.

26. The fluid film journal bearing of claim 25 wherein said first slot includes a plurality of cooling holes through said foils generally disposed between adjacent upper ridges of said individual foil undersprings.

27. The fluid film journal bearing of claim 25 wherein said second slot includes a plurality of cooling holes through said foils generally disposed between adjacent upper ridges of said individual foil undersprings.

28. The fluid film journal bearing of claim 25 wherein each of said first and second slots includes a plurality of cooling holes through said foils, the cooling holes in said first slot axially displaced from the cooling holes in said second slot.

29. The fluid film journal bearing of claim 28 and in addition a first axial row of cooling holes through said foils between said first and second slots and a second axial row of cooling holes through said foils downstream of said second slot, said cooling holes in said first and second slots and said first and second axial rows axially displaced from the other cooling holes in the other slots and rows and each of said cooling holes in said first and second rows generally disposed between adjacent upper ridges of said individual foil undersprings.

30. The fluid film journal bearing of claim 28 and in addition an axial row of cooling holes through said foils between said first and second slots.

31. The fluid film journal bearing of claim 31 and in addition an axial row of cooling holes through said foils upstream of said first slot.

32. The fluid film journal bearing of claim 28 and in additional an axial row of cooling holes through said foils downstream of said second slot.

33. The fluid film journal bearing of claim 24 wherein the arcuate width of each of said first and second slots is between 0.050 and 0.5 inches.

34. The fluid film journal bearing of claim 33 wherein the arcuate width of each of said first and second slots is approximately 0.25 inches.

35. The fluid film journal bearing of claim 24 wherein the coating is selected from a stratified fluorocarbon, polyamide bonded graphite fluoride and molybdenum disulfide.

36. The fluid film journal bearing of claim 24 wherein the coating thickness is at least one fiftieth of the foil thickness.

37. The fluid film journal bearing of claim 24 wherein the distance from an adjacent overlapping foil to the first slot is up to 100 times the foil thickness.

38. A compliant foil for use in a fluid film journal bearing comprising a generally arcuate compliant foil member having a coating of high lubricity material thereon, said coating having at least one axially extending slot therein, the coating thickness being at least one fiftieth of the foil thickness.

39. The compliant foils of claim 38 and in addition a plurality of cooling holes through said foils downstream of said axially extending slot.

40. The compliant foil of claim 38 wherein said coating has two spaced axially extending slots.

41. The compliant foil of claim 38 wherein the arcuate width of the axially extending slot is between 0.050 and 0.5 inches.

42. The compliant foil of claim 38 wherein the arcuate width of the axially extending slot is approximately 0.25 inches.

43. The compliant foil of claim 38 wherein the coating is selected from a stratified fluorocarbon, polyamide bonded graphite fluoride and molybdenum disulfide.

44. The compliant foil of claim 38 and in addition a plurality of cooling holes through said foils in said axially extending slot.

45. The compliant foil of claim 38 and in addition a plurality of cooling holes through said foils upstream of said axially extending slot.

46. The compliant foil of claim 44 wherein said cooling holes are between 0.01 inches and 0.50 inches in diameter.

47. The compliant foil of claim 46 wherein said cooling holes are generally 0.10 inches in diameter.

48. A compliant foil for use in a fluid film journal bearing comprising a generally arcuate compliant foil member having a coating of high lubricity material thereon, said coating having a first axially extending slot therein and a second axially extending slot spaced from said first axially extending slot, said first slot including a first plurality of cooling holes through said foil member.

49. The compliant foil of claim 48 wherein said second slot includes a second plurality of cooling holes through said foil member.

50. The compliant foil of claim 49 wherein the holes of said first plurality are axially displaced from the holes of said second plurality.

51. The compliant foil of claim 50 and in addition a third plurality of holes through said foil disposed between said first and second slots.

* * * * *